June 12, 1962 J. J. RUDOLF, JR., ETAL 3,039,035
AUTOMATIC LATHE CONTROL
Filed June 3, 1957
4 Sheets-Sheet 1

INVENTORS
JOHN J. RUDOLF, JR.
ROBERT L. FILLMORE
BY
Joseph E. Ryan
ATTORNEY

June 12, 1962  J. J. RUDOLF, JR., ETAL  3,039,035
AUTOMATIC LATHE CONTROL

Filed June 3, 1957  4 Sheets-Sheet 2

INVENTOR.
JOHN J. RUDOLF, JR.
ROBERT L. FILLMORE
BY
Joseph E. Ryan
ATTORNEY

June 12, 1962

J. J. RUDOLF, JR., ETAL 3,039,035

AUTOMATIC LATHE CONTROL

Filed June 3, 1957

INVENTORS
JOHN J. RUDOLF, JR.
ROBERT L. FILLMORE

BY

Joseph E. Ryan
ATTORNEY

United States Patent Office 3,039,035
Patented June 12, 1962

3,039,035
AUTOMATIC LATHE CONTROL
John J. Rudolf, Jr., Hopkins, and Robert L. Fillmore, Mound, Minn., assignors to Minneapolis-Honeywell Regulator Company, Minneapolis, Minn., a corporation of Delaware
Filed June 3, 1957, Ser. No. 663,116
7 Claims. (Cl. 318—162)

Our invention is directed to an improved automatic lathe control apparatus and particularly to a lathe control apparatus capable of making a plurality of cuts or passes on a work piece through automatic sequencing apparatus.

Multiple cut lathe control apparatus have been utilized in the past but most of the prior arrangements have utilized mechanical switching arrangements and adjustable stops for determining the length or amounts of movement of the tool in a cross slide direction and without specific provision for interconnecting carriage movement with feed movement of the cutting tool. In the present invention there is presented an improved automatic lathe control apparatus in which any number of cuts may be automatically provided for at any desired depth and over any desired length of carriage travel before a final control of the tool is directed by tracer operation with a simple and readily adjustable mechanism.

It is therefore an object of this invention to provide an improved lathe control capable of automatic multiple cuts or passes on a work piece.

It is further an object of this invention to provide an improved multiple cut lathe control which is capable of any depth or length of cut with a simplified adjustment.

It is further an object of this invention to provide in an automatic multiple cut lathe control an apparatus which is extremely accurate and simple to maintain.

These and other objects of this invention will become apparent from the attached description together with the drawings wherein:

Our improved automatic lathe control is shown in the drawings in connection with a schematic disclosure of a lathe indicated generally at 10 having a base section 11 with carriage guide means 12 positioned thereon and a screw type driving unit 13 operatively connected to and driven from a gear box and motor section 15 attached to and positioned on the under surface and the end surface of the base. Although not shown in detail, in this arrangement the driving motor is of the electric type, as will be later noted. Mounted on the base or bed and guided by the guides 12 is a carriage means 16 designed to be moved back and forth across the lathe bed in a conventional manner through the driving arrangement of the screw type drive means 13 and a cooperating gearing mechanism or drive mechanism 15 on the base of the carriage. Also positioned on the bed or base is an upstanding supporting section 20 positioned at one extremity thereof and mounting in part the gear and motor means 15 and carrying the spindle 22 for the lathe together with a supporting structure 23 with a template. A similar upstanding section or end support 25 positioned near the opposite extremity of the lathe bed is adjustable relative to the guide means 12, this support carrying the centering portion 26 of the spindle with suitable adjustment mechanism 27 for mounting the work piece indicated at 30 in FIGURES 1 and 2. A similar mounting and centering member 31 for the template is also mounted in the upstanding support 25 to center and position the template indicated at 33. The upstanding section 25 is suitably locked in position through means not shown in the base and serves to support one extremity of the work piece and template, the work piece being rotated through a suitable driving mechanism connected to the gear box 15 through the spindle or chuck 22.

Figure 1:
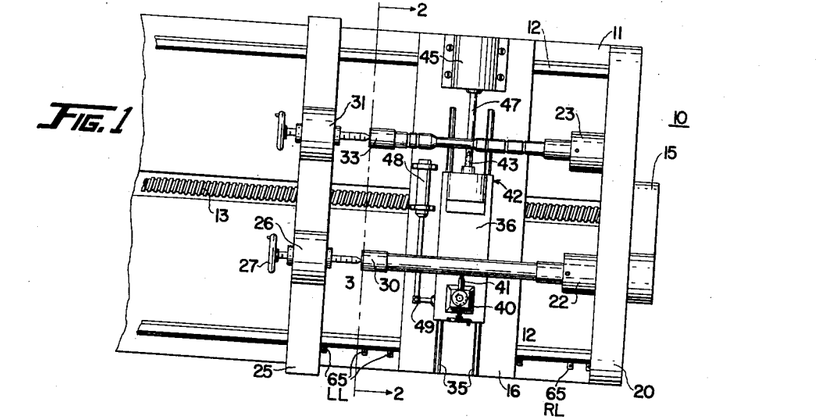
FIGURE 1 is a plan view of a schematic portion of a lathe utilizing our improved invention with the control panel omitted.
Figure 2:
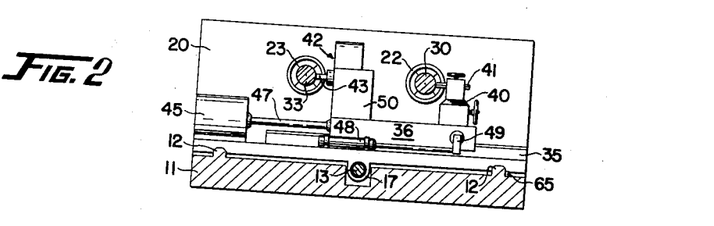
FIGURE 2 is an elevation view in section of the schematic discloseure of FIGURE 1 with the control panel omitted.

The carriage 16 also has carriage guide means 35 positioned thereon for mounting and guiding a cross slide indicated at 36. The cross slide carries or mounts the tool holder and its adjusting mechanism indicated generally at 40 together with the tool 41 positioned in adjacent relationship to the work piece for cutting operation thereon. Cross slide 36 also mounts the follower or tracer mechanism 42 for the template including the sensing stylus 43. The tracer mechanism 42, as will be later noted, includes a transducer to indicate the relative position of the same relative to the template 33. The cross slide 36 is moved on the carriage 16 through a motor means indicated at 45 which is of the hydraulic type but may be any suitable type of motor means, this motor means being connected to the cross slide through a linkage indicated at 47. Carriage 16 also mounts the cross slide transducer indicated generally at 48 which is suitably connected to the cross slide 36 through a connecting member indicated at 49 to indicate the relative position of the cross slide 36 on the carriage means 16.

Figure 3:
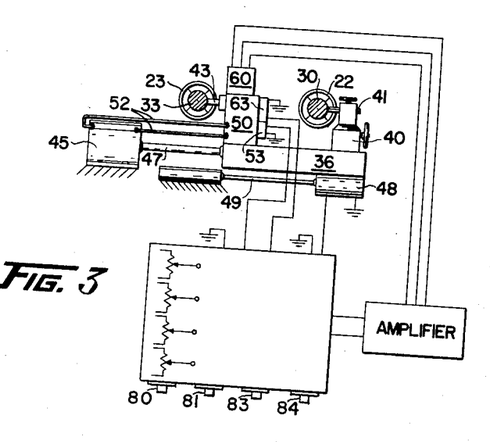
FIGURE 3 is a disclosure of a lathe with the elements of our improved control apparatus.
Figure 3A:
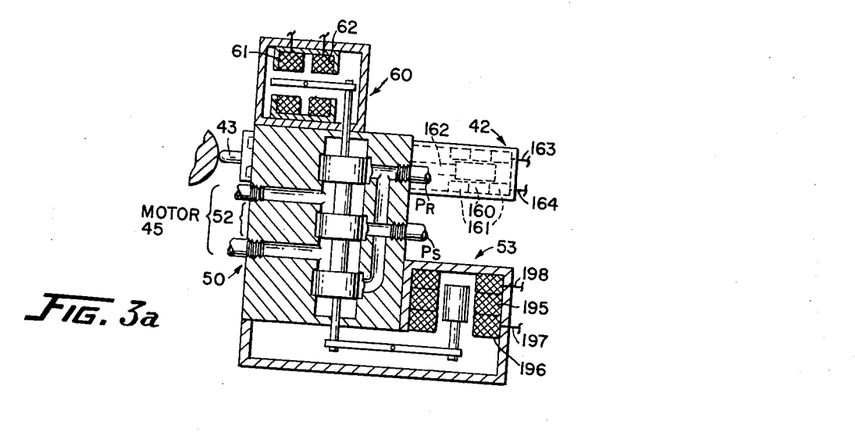
FIGURE 3a is an enlarged section of a portion of the schematic diagram of FIGURE 3.

Positioned with the follower mechanism or tracer mechanism 42 is a valve mechanism shown schematically in block form at 50 which controls a source of fluid pressure from supply and return conduits Ps and Pr to supply and control the hydraulic motive means 45 which moves the cross slide 36 as will best be seen in the enlarged section, FIGURE 3a, of the schematic diagram of FIGURE 3. While the tracer mechanism 42 and the valve mechanism 50 are shown positioned together, they are mechanically independent units which are so mounted for convenience. The tracer mechanism cooperates with the template 33 to provide a signal output which, as will be later seen, controls the valve mechanism 50 through an electrical circuit in conjunction with other control equipment. The valve mechanism could be mounted in other locations if desired since it functions, as indicated above, to control the hydraulic motive means 45 by controlling flow through piping connections such as is indicated at 52 in FIGURE 3 from a source to the motive means 45. The valve means includes a signalling device or position transducer 53 and operates as a three-way valve unit in a conventional manner, being controlled from a torquer or torque motor indicated at 60 including a pair of differentially energizing coils 61, 62, see FIGURE 4, for positioning the valve. As shown herein, our improved automatic lathe control operates from a single axis tracer mechanism in which the tracer sensing stylus or follower 43 is constrained to move in a direction parallel to the movement of the cross slide as it engages pattern or template 33. Movement of the stylus 43 controls the output of the transducer 42 which with the valve transducer 53 is shown electrically in FIG- URE 4 and are included in detail in FIGURE 3a. Also included on the lathe bed or base are a plurality of limit switches indicated schematically at 65 in FIGURE 1 whose functioning will become apparent as the disclosure proceeds.

Figure 4:
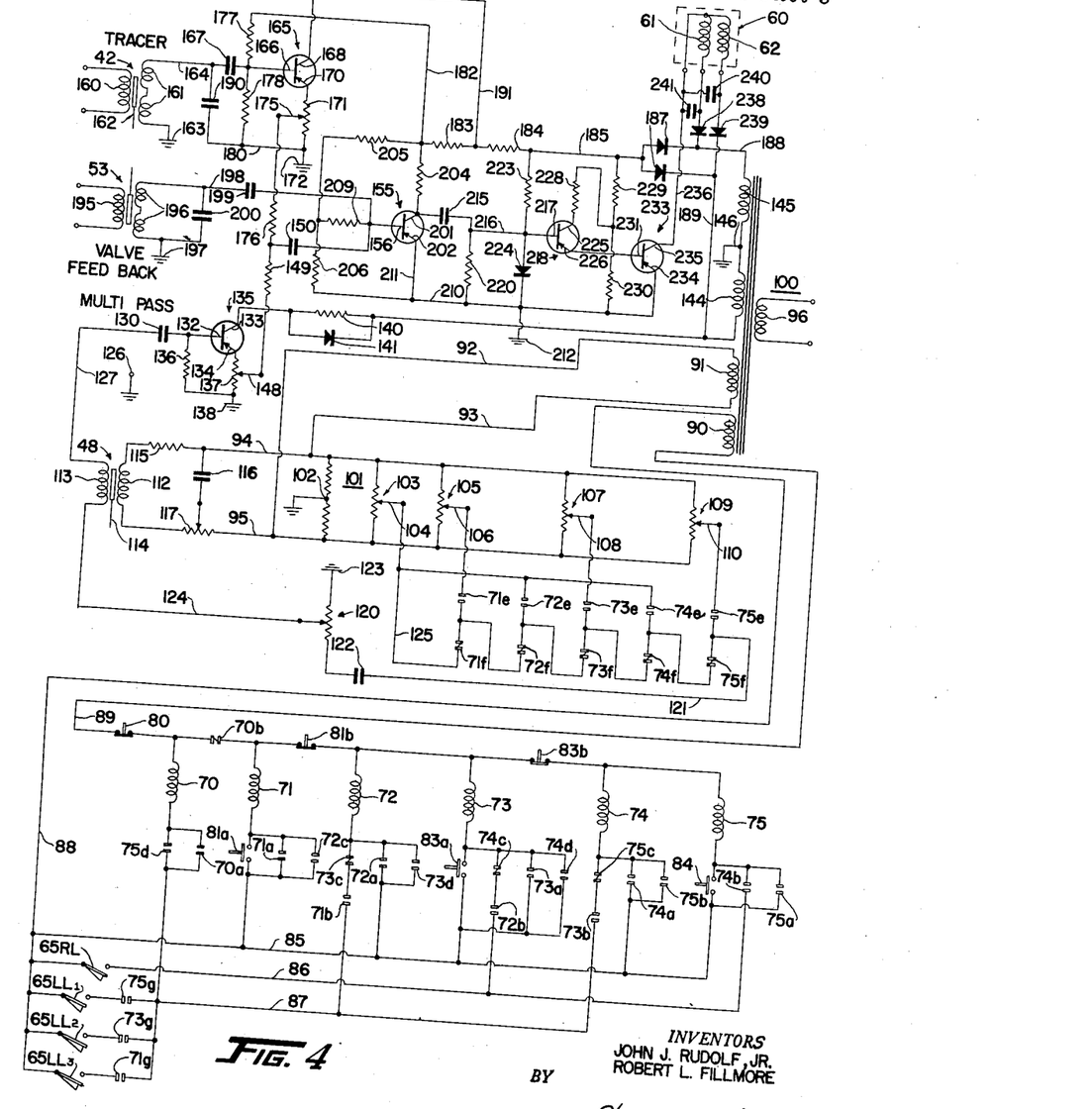
FIGURE 4 is a schematic circuit for the improved lathe control apparatus.

The improved automatic lathe control combines a tracer signal of the single axis type with a feedback signal indicative of the position of the valve controlling the position of the cross slide, a signal indicative of the position of the cross slide and a selectively variable signal from a depth control apparatus or multipass control to control an amplifier and torque motor operating the valve, which valve controls the flow of hydraulic fluid to a hydraulic type motor operating the cross slide on the carriage means. In FIGURE 4 there is shown the circuit details of the relay and bridge transducers employed together with the relay and bridge supply for the depth control or multipass control and the amplifying means controlling the energization of the torque motor 60.

As will be seen in FIGURE 4, the depth control portion of the circuit is comprised of a plurality of relays the coils of which have been designated with the numbers 70 through 75 with the contacts associated with the relays identified by the same numeral and a small letter suffix. In addition, the circuit includes a plurality of push buttons numbered 80, 81, 83, and 84, with the push buttons 81 and 83 having normally closed and normally open contacts to be separately identified with the letter suffix. In the group of relays shown, 70 represents a stop relay and the relays 71, 73, and 75 represent "in" relays for setting up circuits to the multipass control directing an infeed to a new selected depth of control as will be later evident, while the relays 72 and 74 are of the retract type setting up circuits to return the cross slide to a retracted position. The numerals 65 have been further identified as RL and LL indicating that these are momentary type normally open limit switches with the letter designation RL indicating the limit switches on the right hand end of the lathe bed and the limit switches LL with a number suffix 1, 2, or 3 indicating a plurality of left limit switches located toward the left end of the lathe bed. These relay circuits are energized from the primary energizing source or transformer indicated at 100 whose primary winding 96 is adapted to be connected to an alternating current source of power and whose secondary winding 90 is connected to conductors 88 and 89 to the input of the relay circuits to be hereinafter identified in detail. The source of power 90 supplies through conductors 88 and 89 a circuit which includes the normally closed stop button 80 and the normally closed relay contact 70b together with relay coil 71 and the first momentary contact start switch 81a. With the closure of switch 81, the relay coil 71 will be energized and a holding circuit set up by the contact 71a in parallel with the push button 81a will be completed. This circuit will be completed to the conductor 88 through the return conductor 85. With the closure of contact 71a, the holding circuit will be made as indicated above and the contacts 71b, e, and g will be also made while the contact 71f will be opened. Omitting at the present time the effects of the operation of the contacts e and f and considering only the relay circuit, it will be noted that with the closure of contact 71b a circuit will be set up from the conductor 89 through the push button 80, contact 70b and push button 81b through the coil 72 and the normally closed contact of 73c to the conductor 87 and contact 71g to the limit switch 65LL3 which limit switch is indicated as normally open but upon closure would complete the circuit to the conductor 88 and the supply 90. Thus, with movement of the carriage toward the left extremity of the bed, the limit switch identified as 65LL3 would upon closure complete the energizing circuit for the relay coil 72. Energization of the relay 72 would set up the holding circuit for the relay through the contact 72a in a circuit from the coil 72, the contact 72a, the conductor 85 to the conductor 88 which effectively parallels the contacts 73c, 71b, 71g and limit switch 65LL3. Operation of the relay 72 will also operate the contact 72e to a closed position and contact 72f to an open position and close the contact 72c connected in parallel with the contact 71a and push button 81a as a further holding circuit on the coil 71. The closure of contact 72b of relay 72 sets up a circuit for the coil 73 from the conductor 89 through the push button 80, contact 70b, push button 81b to the coil 73 then through the normally closed contact 74c to the contact 72b and conductor 86 leading to the limit switch 65RL and the conductor 88. The right limit switch 65 65RL will be closed when the carriage means reaches the right extremity of the lathe bed completing this circuit for the coil 73. It will be also noted that a separate energizing circuit for the coil 73 is provided by the contact 83a of the momentary push button type which would complete the circuit from the coil 73 through the push button contacts 83a to the conductor 85 and the conductor 88. The purpose of this push button will be later noted. A holding contact 73a is connected in parallel around the push button 83a in a conventional manner to provide a holding circuit around the push button 83a for the coil 73. A contact 73d is also made and is connected in parallel with the holding contact 72a for the coil 72 to provide additional holding circuit means on this coil. With the energization of coil 73 its contacts 73e and 73f are operated and the contact 73b is made along with the contact 73g to set up an energizing circuit for the coil of relay 74. This energization circuit is made from the secondary winding 90 and a conductor 89 through the push button 80, contact 70b, push button 81b and normally closed push button 83b through the coil 74, normally closed contact 75c, contact 73b, conductor 87, contact 73g, left limit switch 65LL2 to the conductor 88. Coil 74 will not be energized however until the limit switch 65LL2 is completed when the carriage reaches the limit switch position near the left end of the lathe bed. Energization of this relay 74 will close the contacts 74a to set up the holding circuit from the coil 74 through the contact 74a and conductor 85 to the conductor 88 in a conventional manner. The energization of the coil 74 which is a second retract relay will operate the contacts 74e and f and will complete the contact 74b setting up a circuit for the energization of relay coil 75. The coil 75 is energized from the circuit of conductor 89, switch 80, contact 70b, switch 81b, switch 83b, coil 75, contact 74b, conductor 86 to limit switch 65RL and conductor 88. It will be noted that in parallel with limit switch 65RL in series with contact 74b is a push button 84 to selectively energize the relay coil 75. Energization of the relay 75 will close the contacts 75a, b, d, e, and g. Closure of the contacts 75d and g will set up the circuit for the relay coil 70 or the stop relay which will be energized upon completion of the limit switch 65LL1 to energize the contact 70a as a holding contact around the contact 75d and to open the normally closed contact 70b dropping out the relays 71 through 75. The relay 70 will remain energized as long as the limit switch 65LL1 remains closed. It will be understood from a review of the circuit that the relays 71 through 75 will operate in sequence upon being initiated by the push button 81a with the sequential closure of the limit switch contacts 65RL and 65LL1, 2 and 3. The push buttons 81b and 83b are selective stop buttons which may be operated to deenergize the relay circuit after the operation of the relay 71 in an "in" direction or the relay 73 in an "in" direction. Further, the momentary buttons 83a and 84 may be utilized to selectively energize the relays 73 or 75 independent of the relay 71, etc. Push button 80 is a master stop button which when operated will deenergize all of the aforementioned relay circuits.

As was noted above, the relays 71 through 75 upon energization operate contacts 71 through 75e and f. These relay contacts are included in a bridge circuit for supplying the depth or multipass signals to the control apparatus, Considering the signal bridge, it will be noted that the bridge is energized from the secondary winding 91 of the transformer 100 through conductors 92, 93 to conductors 94, 95. Connected across the conductors 94, 95 are a plurality of potentiometers 103, 105, 107, and 109 in parallel and a reference voltage divider 101 which is center-tapped at 102 to form the bridge network. The conductors 94, 95 also are connected through a filter network formed of resistors 115 and condenser 116 and an adjustable potentiometer 117 to the primary winding 112 of the carriage cross slide transducer 48 for energizing the same. Of the potentiometers making up the bridge network, 103 represents the retract signal and 105, 107, and 109 are the varying degrees of depth of cut signal. A bridge output is obtained across the grounded center tap 102 of the voltage divider 101 and the wipers 104, 106, 108 and 110 of the respective potentiometers 103, 105, 107 and 109. Connected in series with these wipers are the relay contacts which select, upon operation, the respective potentiometer to be connected to form the output circuit of the bridge network. It will be noted that the wiper 104 is connected through a conductor 125 and the normally closed contacts 71f, 72f, 73f, 74f, 75f, the conductor 121, a condenser 122, to the potentiometer 120 and the ground connection 123 to complete the output circuit for the bridge network formed between the potentiometer 103 and the tapped resistor 101. Thus the potentiometer 103 is normally in circuit to supply a retract signal to the amplifier of the lathe control apparatus. Operation of the relay 71 will close the contact 71e and open the contact 71f disconnecting the potentiometer 103 and connecting the potentiometer 105 in a bridge circuit such that the wiper 106 is connected through the contact 71e and normally closed contacts 72f, 73f, 74f, 75f to the conductor 121, condenser 122 and ratio potentiometer 120. It will be noted that the potentiometers 105, 107, 109 and 103 would normally be adjusted at varied positions along the extent of their respective windings such that the voltage differential between the respective wipers and the ground point 102 of the other half of the bridge network will give signals of varying magnitude and phase across the ratio potentiometer 120. These signals will in effect indicate to the torquer and hence the valve, a reference or set position for the cross slide as the carriage moves in one direction or the other. It will also be evident that as the relays 71 through 75 operate in sequence, that the output of the bridge network will vary from a retract signal to a first depth cut signal as evidenced by potentiometer setting 105 and upon a reverse in direction in carriage movement, and operation of the relay 72, the retract signal will again appear until the relay 73 is operated at which time the depth signal evidenced by the setting of potentiometer 107 appears. With the next sequence caused by the operation of relay 74 and a reversal of carriage movement, the retract signal will again be present across the bridge output terminals and impressed on the ratio potentiometer 120 followed by the final depth signal as evidenced by the setting of potentiometer 109 with operation of relay 75. As was previously noted, the relays as they operate remain pulled in or energized through their respective holding circuits and consequently the normally closed contacts 71f through 75f are sequentially operated to isolate the potentiometer 103 from the output network such that it will only be made with the operation of the contacts 72e and 74e in that sequence. Similarly, the potentiometers 105, 107, and 109 will be connected in sequence with the sequential closing of the contacts 71e, 73e and 75e which will complete the circuit through the normally closed contacts to the respective potentiometers for the relays that have not yet been operated. As was indicated in connection with the relay circuits, the push button 81a may be utilized to initiate the entire sequence and the push button 81b may be utilized to stop the sequence after the energization of the relays 71 or 72, or 71 only, to limit operation to the first depth of cut. If it is desired for set-up purposes, the push buttons 83a and 84 may be utilized to selectively start at the second and third depth of cut signals, respectively, should it be desired to either check or start at a second or third depth of cut. The push button 83b serves the same function as the push button 81b in that it will stop the sequence of operation after the first or second cut or after the second cut if it should be initiated by the button 83a before the final depth of cut adjustment is made through the operation of relay 75. Further, with the final operation of relay 75 and the reverse of the direction of the cross slide to the retract position with the reverse in direction of movement of the carriage, the relay 70 will be operated to isolate and deenergize all of the relays. It will be noted that in this position only the retract signal is present on the ratio potentiometer 120.

The ratio potentiometer 120 is connected in series with the outputs of the bridges enumerated above for the purpose of adjusting the ratio of the depth of cuts or multipass signals to be balanced by a cross slide transducer. Connected in series with the ratio potentiometer or to the wiper of the same is a conductor 124 connecting a secondary winding 113 of a cross slide transducer 48 which indicates the position of the cross slide on the carriage base. This latter signal is compared with and balances the setting signal coming from the bridge network to indicate either that the desired depth of cut or the retract position of the cross slide has been reached. This condition is indicated to the amplifier and valve to control cross slide movement. Thus the signals from the bridge network and the cross slide transducer 48 are differentially compared and the difference between the two is connected through the conductor 127 to the input of the amplifier to be hereinafter identified. A grounded connection 126 for the amplifier completes the input circuit for the differential signal.

FIGURE 4 also includes the schematic circuit diagram for the amplifier which has impressed on it the same signals from the multipass bridge circuitry, the tracer input signal and a feedback signal from the pilot valve. The multipass bridge circuit or depth control circuit includes the feedback signal from the cross slide and is connected to the amplifier through the conductor 127 and a coupling condenser 130 to a first transistor amplifying stage 135 formed by a transistor having a base 132, a collector 133, and an emitter 134. The condenser 130 is connected to the base 132 and a bias resistor 136 is connected between the base and the emitter-resistor 137 which is grounded as at 138. The collector 133 is connected to a bias supply through a load resistor 140 which has connected in parallel therewith a rectifier 141 which operates as a discriminator to permit only "out" sense signals to be conducted therethrough for purposes to be later identified. The resistor 140 is connected to one extremity of a pair of serially connected secondary windings 144, 145 of transformer 100 which has a ground connection 146 between the two secondaries. The emitter-resistor 137 is actually a potentiometer having a wiper 148 which is connected through a summing resistor 149 and a coupling condenser 150 to the base 156 of a second amplifying stage 155 or transistor amplifier. Also fed to the parallel summing arrangement is a signal from the tracer transducer 42. Transducer 42 is of the differential transformer type having a primary energizing winding 160 and a pair of serially opposed secondary windings 161 with a movable core member 162 connected to the tracer sensing stylus. The opposed coils 161 are grounded as at 163 and are connected through a conductor 164 165 at its base 166. Transistor 165 includes the collector 168 and emitter 170, the emitter being connected through a bias ratio potentiometer 171 to a ground connection 172. The emitter-resistor 171 is of the potentiometer type whose wiper 175 is connected through a summing resistor 176 to the resistor 149 and through the coupling condenser 150 to the base 156 of the amplifier 155. The base 166 of the pre-amplifying stage 165 from the tracer transducer has connected thereto a voltage dividing network formed of resistors 177, 178 with a common connection between the resistors connected to the base 166 and the extremity of the resistor 178 connected to the ground connection 172 through a conductor 180. The resistor 177 is connected through a conductor 182 and a voltage dropping resistor 183 and 184 to a conductor 185 which in turn is connected to the pair of diodes 187 which have like polarity terminals connected together and to the conductor 185 with the opposite extremities connected through conductors 188, 189 to the extremities of the secondary windings 144, 145 of the transformer 100. This circuit supplies a negative supply to the base of the transistor. A condenser 190 is connected across the bias resistor 178 for phase shift adjustment of the tracer signal input. The collector 168 of transistor 165 is connected through a conductor 191 to the voltage dropping or load resistor 184 and the bias supply from the rectifiers 187.

Also included as an input signal to the amplifier is the signal from valve transducer 53 which supplies a feedback signal to the base 156 of the transistor 155. The valve transducer 53 is of the differential transformer type having a primary winding 195 and a pair of serially opposed secondary windings 196 one extremity of which is grounded at 197 and the other extremity of which is connected through a conductor 198 and a coupling condenser 199 to the base 156 of transistor 155. A phase shifting condenser 200, connected in parallel with the windings 196, adjusts phase of this input signal.

Thus the signals from the tracer transducer, the valve feedback transducer, and the multipass control are impressed on the base 156 of the transistor amplifier 155 which includes a collector 201 and an emitter 202, the collector 201 being connected through a load resistor 204 to the voltage dropping resistors 183, 184 leading to the rectifiers 187 of the bias supply. Voltage dividing resistors 205, 206 are connected in series from the resistor 183 to a ground conductor 210 which is grounded as at 212 with the midpoint of the dividing resistors 205, 206 being connected through a biasing resistor 209 to the base 156 of the transistor 155. The emitter 202 is connected through a conductor 211 to the ground conductor 210. The output of the transistor 155 is condenser coupled through a condenser 215 and the conductor 216 to a base 217 of a third amplifying stage 218. A biasing resistor 220 is connected between the condenser 215 and the ground conductor 210. Similarly, a biasing resistor 223 is connected between the conductor 185 and the base 217 with a limiter or half wave rectifier 224 connected between the base 217 and the ground conductor 210. The transistor 217 includes a collector 225 and an emitter 226, the collector being connected through a load resistor 228 to a voltage dividing network formed of resistors 229 and 230 which are connected in series between the conductor 185 and the ground 212. The emitter 226 is directly coupled to the base 231 of a final amplifying stage 233 or transistor having an emitter 234 and a collector 235. The emitter 234 is directly connected to the ground conductor 210 while the collector 235 is connected through a conductor 236 to the common extremities of the differential torquer windings 61, 62 of the torque motor, which windings are connected respectively through a pair of similarly poled rectifiers 238, 239 to the opposite extremities of the serially connected secondary windings 144, 145. Filter condensers 240, 241 are connected respectively across the torque motor windings 62 and 61 for filtering purposes. The diodes or rectifiers 238, 239 provide the negative D.C. supply through the torque motor windings to the collector 235 in a circuit which is completed through the emitter 234, ground conductor 210, ground 212 and the grounded center tap 146 of the secondary windings 144, 145.

Thus it will be seen that the input signals from the tracer 42 and multipass control are parallel summed with the feedback signal from the valve transducer 53. The summation of these three signals controls the operation of the amplifier 155 which is condenser coupled to the transistor amplifier 218 which amplifying unit is directly coupled to the final amplifying stage 233 differentially controlling the energization of the torque motor windings 62, 61 depending upon the sense and magnitude of the summation of the input signals. The tracer mechanism although not shown completely in the drawings is normally biased such that the sensing stylus 43 will be urged or directed toward the template and when the tracer is out of engagement with the template the tracer transducer will have generated therein a signal which will be of a sense and magnitude to provide an "in" signal for the torque motor 60 control. The signals from the multi-pass bridge circuit or depth control including the retract potentiometer are normally of a sense but of varying magnitude for an "in" control signal; that is, these signals by themselves would operate the torque motor in an "in" direction. It should be recognized that the retract position would be of the smallest magnitude of "in" signal and the succeeding depth signals would be of greater magnitude. The positional feedback transducer 48 from the cross slide 36 is of the opposite sense and will substantially balance these signals from the bridge circuit. The discriminating action of rectifier 141 on transistor 135 is such that only "out" sense signals will be fed to the summing circuit. Thus the "in" signals from the bridge circuit will not enter the amplifier and torque motor but merely are summed with the signals from the cross slide transducer 48 to determine the balance condition. The output of the tracer 42 controls the amplifier and torque motor 60 in the "in" feed direction. When the cross slide signal becomes equal to and goes beyond the magnitude of the bridge signal, the multipass output changes sense and the discriminating action permits these "out" sense signals to be fed to the summing network to counterbalance the tracer output signal and set up a null input condition for the amplifier and torque motor terminating "in" feed of the cross slide. The valve feedback is primarily for stabilization purposes. It should be recognized also that after the stylus has engaged the template, the tracer transducer will reach a null position and too great a pressure on the tracer stylus 43 will create a signal of an opposite magnitude calling for an "out" signal from the tracer control.

Figure 5:
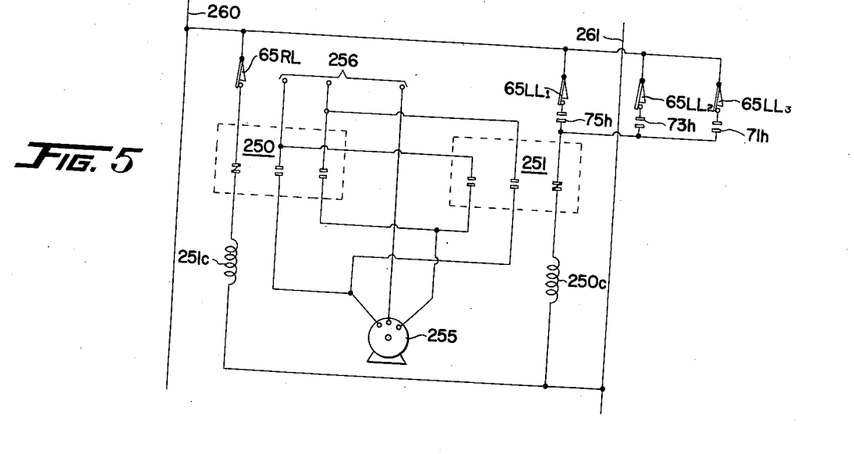
FIGURE 5 is a motor control circuit for one of the driving motors of the lathe.

In operation our improved automatic control apparatus provides for automatically introducing to the amplifier at selected sequential intervals, signals of a particular magnitude and sense which will determine the depth of the cut for the lathe control or the position of cross slide relative to the carriage base and hence the tool relative to the work. As the multiple cuts are taken, the tracer stylus 43 will be normally out of contact with the template and will provide a constant magnitude "in" signal. The depth control or the retract control signal will, however, be primary and controlling in that they determine the position of the cross slide at null output for the multipass control. The "out" sense signal from the multipass control will operate to reduce the net signal to the amplifier and torque motor to zero, and the overtravel required to stop the "in" movement of the cross slide may be compensated for in the adjustment or setting of the depth control potentiometer. The final depth cut will be controlled primarily from the tracer transducer which will contact the template throughout the cut. It will further be recognized that this improved apparatus may be started at any one of the varying depth points and may be modified to include any number of cutting depths merely by enlarging the control circuitry. A single cut of a particular depth may be taken and the apparatus disengaged or the apparatus may be selected to start at the final depth of cut and operate directly off the tracer. In FIGURE 5 is shown the carriage motor control which operates from the limit switches together with the control contacts from the relays 71, 73, 75 to control the operation of a pair of start contactors indicated at 250 and 251 respectively with the coils for the contactors identified as 251c and 250c, respectively. It will be noted that the carriage motor is of the electric type and is identified at 255 being energized from a three-phase supply at 256. Carriage motor 255 is that shown in the motor and gear box 15 as the driving motor for the motor and gear box unit 15 of FIGURE 1. The contactor mechanisms 250 and 251 are utilized for reversing the phase connections of the source 256 to the windings of the motor 255 to reverse the direction of rotation of the same. A normally closed contact for each of the contactors 251, 250 operates as an electrical interlock to prevent simultaneous energization of the contactors. Whenever the normally closed limit switch 65RL is in its closed position, the coil 251c of the contactor 251 will be energized closing the contacts 251 and opening the normally closed contact 250 to isolate the coil 250c from the energizing source. The line contacts of the contactor 251 will connect the three phase supply to the windings of the motor 255 to direct the carriage toward the right hand limit switch or the right hand end of the lathe bed until the right limit switch is engaged and the contactor 250 deenergized. It will be noted that the left hand limit switches have connected in series therewith contacts 71h, 73h and 75h for the varying limit switches 65LL3, 2 and 1 in the same manner as the relay control circuitry. Thus depending upon the starting position the carriage motor control circuit will be in an operative position whenever the relays 71, 73 or 75 are energized. When the right limit switch 65RL is engaged, the coil 251c will be deenergized and the coil 250c will be energized through the circuit made by the normally closed contacts of the contactor 251 then through the closed limit switch 65LL1, 2, or 3 depending upon the position of the carriage. This will close the contacts of the contactor 250 to reverse the connection of the phase windings of the motor 255 to the supply 256 to reverse the direction of the carriage causing the same to be driven in the left hand direction. As soon as the first left limit switch is reached corresponding with the relay which is energized, the contactor 250 will be deenergized and the reversing sequence will take place. The energizing supply for the motor contactor control circuits is identified as conductors 260, 261 across which the coils 250c and 251c are connected through the limit switches identified above. Thus, the carriage motor will operate in connection with the relay circuits to selectively reverse the direction of the carriage such that as the carriage reaches the right hand end of the lathe bed, the right limit switch will be engaged and one or the other of the selected depth signals will be connected into the amplifier together with the tracer and feedback signals to operate the torquer and position the associated valve to adjust the position of the cross slide on the carriage such that the tool may engage the work piece at a desired depth. The direction of carriage motion is then reversed, and the carriage is driven toward the left hand end of the lathe bed and toward the left limit switches. When the left hand limit switches are engaged the relay circuits will cause the cross slide means to assume a retract position and the carriage drive will again be reversed.

Figure 6:
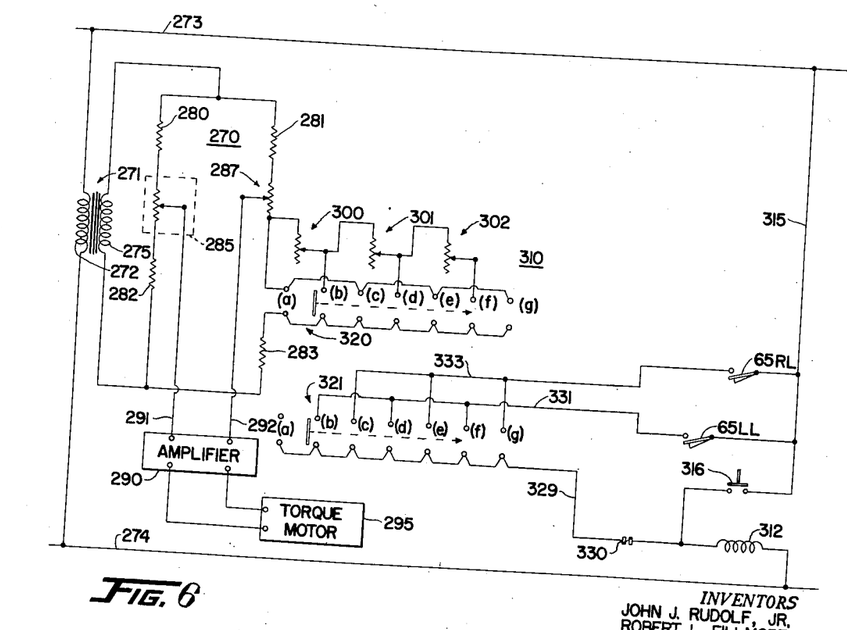
FIGURE 6 is a schematic circuit of a second embodiment of the invention.
Figure 7:
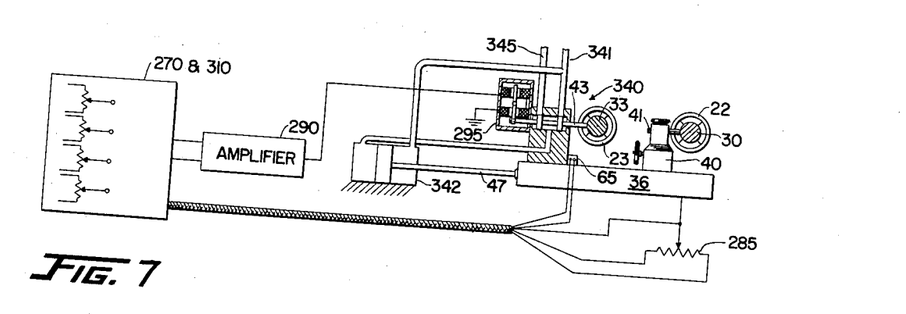
FIGURE 7 is a schematic disclosure of the embodiment using the circuit of FIGURE 6.

FIGURES 6 and 7 show a second embodiment of the automatic depth controller or lathe control apparatus in a schematic drawing and circuit with the circuit disclosure detailing only the portion of the apparatus controlling the torque motor. In this arrangement, the tracer mechanism controls the valve directly and is overcome or opposed in operation by the torque motor with the valve controlling, as in FIGURES 1, 2, and 3, the hydraulic motor positioning the cross slide. The carriage drive means will be substantially the same as that disclosed in FIGURE 5 with the exception that the relay contacts 71h, 73h, and 75h will be replaced by suitable make contacts on the controller to be described. In this embodiment the main control element is a bridge circuit indicated at 270 which is energized from a transformer 271 having a primary winding 272 connected across the pair of supply leads 273, 274. The transformer 271 has a secondary winding 275 which is connected to the input terminals of the bridge formed of a plurality of resistive elements 280, 281, 282 and 283 with an adjustable potentiometer 285 which is operated by the cross slide as a feedback of the positional type and a potentiometer 287 in the opposite leg which is designed to be manually adjustable to set the retract position for manual advance or retard movement of the cross slide. The wipers of the potentiometers 285 and 287 are connected to an amplifier indicated at 290 through conductors 291, 292 forming the output diagonals of the bridge and with the amplifier 290 controlling the energization of a torque motor 295 positioning the pilot valve which controls the hydraulic motor for the cross slide. The bridge circuit 270 has adapted to be included therein a plurality of adjustable potentiometers 300, 301 and 302, with selective operation of a stepping type controller or switching mechanism indicated generally at 310 having a plurality of sets of contacts to be later identified. The stepping switch or controller 310 has an energizing coil 312 which is connected across the supply leads 273 and 274 through a conductor 315 and a momentary push button type make switch 316 to a conductor 274. The stepping switch has a first set of contacts 320 having a plurality of contact positions a, b, c, d, e, f and g as shown in FIGURE 6 and a second set of contacts 321 with the same contact positions a through g. It will be noted from the drawing that the switching arrangement or mechanism 320 is so connected to the bridge network 270 that for positions a, c, e and g, the winding of potentiometer 287 and the fixed resistor 283 are directly connected to one another and none of the potentiometers 300–302 are included in the bridge network. At position b, the potentiometer 300 is connected through the contacts in series with the resistor 283 in one leg of the bridge circuit as is also the case for the potentiometer 301 for position d and 302 for position f. As will be noted in FIGURE 6, this arrangement is provided by a connection of the one end of the winding of the potentiometer 300 to the resistors 287 and the connection of the succeeding potentiometer windings to the wiper of the preceding potentiometer and by further connection of the wipers of the respective potentiometers to the indicated switch position. One contact for each of the switch positions is permanently connected to the resistor 283 to complete this circuit. Thus, depending upon the position of the switching element for the set of contacts 320 of the switching device 310, one or the other of the plurality of potentiometers will be included in the bridge network or none of the potentiometers will be positioned in the bridge network. The contact mechanism 321 which is also a part of the switching device 310 and is operated by energization of the coil 312 has similar positions a through g with one contact for all positions being connected in common through a conductor 329 and a normally closed contact 330 of the switching mechanism 310 to the coil 312 and conductor 274. The opposite sides of contacts b, d and f are connected in common through a conductor 331 to the normally open limit switch 65LL and conductor 315. The similar contacts for positions c, e, and g for switch mechanism 321 are connected in common through a conductor 333 to the normally open limit switch 65RL which is connected in turn to the conductor 315. As indicated above, although not specifically shown in the drawings, it will be understood that the carriage motor circuit will be similar to that of FIGURE 5 and that the left limit switch will have included therewith contacts which will be made respectively in the b, d and f positions for the switching device. With this arrangement, the stepping sequence is initiated by the momentary operation of the button 316 when the switch element for the contacts 320, 321 are in the position *a*. With this arrangement, the signal output from the bridge will be such as to have the torque motor operated to displace the cross slide in a retract position. Energization of the coil 312 through the circuit formed by the contact of the momentary switch 316 will cause the switching device 310 to move its contacts 320, 321 to the *b* position wherein the potentiometer 300 will introduce to the bridge an additional resistive component indicative of the first depth of cut and the switching circuit formed by the switch 321 will connect the coil 312 in circuit with the left limit switch 65LL. In this circuit arrangement, for simplicity we have omitted the details of the additional left limit switch performance, but it will be understood that they would be included in parallel with the switch unit 65LL as shown and with the addition of the additional switch contacts corresponding to positions *b*, *d*, and *f*. When the left limit position has been reached, the circuit to the coil 312 will be completed due to the operation of the momentary contact of the limit switches and the coil will be energized to adjust the switching element 320, 321 to a *c* position. In this position the lower leg of the bridge is again formed only by the resistor 283 and the lower half of the potentiometer 287 and none of the setting potentiometers 301—302 are included therein. Similarly, a circuit is set up for the coil 312 through the right limit switch to prepare for the next switching sequence when the carriage reaches the right limit position.

It will be understood that the potentiometer 285 will indicate the position of the cross slide on the carriage to balance the required setting signal and deenergize the torquer when the setting position has been achieved. The momentary contact 330 of the switching device 310 operates to provide the sequencing of the switching device 310 as each of the circuits are made through the respective limit switches 65RL and 65LL. Thus, as the right limit switch is engaged the switching device 310 will operate to the position *d* bringing in to the bridge circuit the potentiometer 301 and setting up the unbalance of the bridge to provide a new energization and position for the torque motor 295 for controlling the pilot valve and hence the cross slide to a second depth of cut. Similar switching of the device 310 will occur with the engagement of the limit switch 65LL and the contact position *e* will be reached bringing the bridge to the original position corresponding to the retract position of the cross slide. With additional sequencing of the switching device 310 the succeeding positions of *f* and *g* will be reached, the *f* position indicating the final depth of cut at which the tracer will be engaged with the template and will control directly the hydraulic mechanism including the pilot valve to position the cross slide. The final *g* position is a retract position at which point the apparatus may be shut down. This second embodiment of the multipass or cut control for automatic lathe operation is shown here only schematically to indicate another means of obtaining the sequencing for introducing the desired depth of cut signals into a control network controlling the torque motor which would position the cross slide relative to the carriage.

FIGURE 7 shows schematically an end view of the lathe with details of the hydraulic tracer control operating directly on the pilot valve with a torque motor operating co-jointly therewith to position the pilot valve. The valve 340 is shown as a three-way type controlling the flow of fluid from a source of hydraulic pressure indicated at 341 to one extremity of the differential piston type actuator indicated at 342 and from this end of the cylinder to an exhaust port 345. The opposite end or small area side of the cylinder for the differential area actuator is connected directly to source 341 to provide for differential operation in accordance with valve position. The torque motor 295 will operate in opposition to the tracer valve to control therewith the ratio of pressures and hence forces on ends of the hydraulic piston. The tracer valve will be biased toward the template through spring means, not shown, and the torque motor will be effective to move the tracer valve in an "out" direction only. It will be seen that the cross slide transducer or potentiometer 285 is connected into a multipass control incorporating the bridge 270 and the switching device 310 with its associated circuits, the output of which controls the amplifier 290 to control the energization of the torque motor 295. As indicated above, the carriage motor device will be substantially the same as the mechanism shown in FIGURE 5 and FIGURE 1 including the carriage motor 255 which is controlled by the contact mechanisms 250, 251 through operation of the switches 65RL and 65LL.

While we have shown herein the use of varying limit positions in the left hand direction of carriage travel with the varying depth control, it will be understood that similar varying limit positions may be incorporated with the right hand limit switch circuitry to correspond with the various retract relays or switching conditions in the embodiment shown in FIGURES 1 to 5 or with the retract positions of the switching device 310 as shown in FIGURE 6.

In considering this invention it should be remembered that the present disclosure is illustrative only and we wish to be limited in the scope of our invention only by the appended claims.

We claim:
1. Apparatus for controlling a machine: a support, a cross slide, a carriage mounted on said support and holding said cross slide for movement, a template mounted on said support, first motive means for moving the cross slide on the carriage, and second motive means for moving the carriage on said support longitudinally of the cross line movement, a tracer means mounted for movement with said cross slide to engage said template and produce a signal indicative of the desired movement of the cross slide, a further signal producing device connected to said cross slide to produce a signal whose magnitude is indicative of the position of the cross slide, balanceable means comprising said tracer means and said further signal producing means connected in opposition for controlling said first motive means to control the movement of the cross slide, said tracer means having a limited signal output so as to provide for limited accurate movement of said first motive means when said tracer means approaches the template, a multiple pass control means for initially controlling said first and second motive means to cause initial movements until the template is within range of said tracer means, said multiple pass control means including a plurality of adjustable signal producing devices each adjustable to give a signal whose magnitude is representative of one of a plurality of desired positions of the cross slide relative to the carriage, further balanceable means for controlling said first motive means comprising a selected one of said adjustable signal producing devices and said further signal producing device in opposition to cause the cross slide positioned by the first motive means to move an amount determined by the magnitude of the signal from the selected one of said adjustable signal producing devices, a plurality of adjustable limit switch means for defining desired movement of the carriage of said machine longitudinally, means connecting said limit switch means to said second motive means for limiting the movement of the carriage longitudinally of the template, and means controlled by said limit switch means for sequentially connecting into controlling relation the several adjustable signal producing devices as operations determined by said adjustable signal producing devices are completed so as to cause successive operations of the machine each determined in depth by one of said adjustable signal producing devices and in length by the adjustable limit switch means until the said tracer means is close to said template and is capable of maintaining the control of the first motive means.

2. Apparatus for controlling a machine: a support, a cross slide, a carriage mounted on said support and holding said cross slide for movement, a template mounted on said support, first electromagnetic motive means for moving the cross slide on the carriage, and second electromagnetic motive means for moving the carriage on said support longitudinally of the cross line movement, a tracer means mounted for movement with said cross slide to engage said template and produce a variable electrical signal output indicative of the desired movement of the cross slide, a further signal producing device connected to said cross slide to produce a variable electrical signal output whose magnitude is indicative of the position of the cross slide, balanceable electrical network means comprising said tracer means and said further signal producing means connected in opposition for controlling said first electromagnetic motive means to control the movement of the cross slide, said tracer means having a limited signal output so as to provide for limited movement of said first electromagnetic motive means when said tracer means approaches the template, a multiple pass control means for initially controlling said first and second electromagnetic motive means to cause initial movements until the template is within range of said tracer means, said multiple pass control means including a plurality of adjustable electrical signal producing devices each adjustable to give an electrical signal output having variable magnitudes which are representative of one of a plurality of desired positions of the cross slide relative to the carriage, further balanceable network means for controlling said first electromagnetic motive means comprising a selected one of said adjustable signal producing devices and said further signal producing device in opposition to cause the cross slide positioned by the first electromagnetic motive means to move an amount determined by the magnitude of the electrical signal from the selected one of said adjustable signal producing devices, a plurality of adjustable limit switch means for defining movement of the carriage of said machine longitudinally, means connecting said limit switch means to said second electromagnetic motive means for limiting the movement of the carriage longitudinally of the template, and means controlled by said limit switch means for sequentially connecting into controlling relation the several adjustable signal producing devices as operations determined by said adjustable signal producing devices are completed so as to cause successive operations of the machine each determined in depth by one of said adjustable signal producing devices and in length by the adjustable limit switch means, until said tracer means is close to said template and is capable of maintaining the control of the first electromagnetic motive means.

3. Apparatus for controlling a machine: a support, a cross slide, a carriage mounted on said support and holding said cross slide for movement, a template mounted on said support, first electromotive means for moving the cross slide on the carriage, and second electromotive means for moving the carriage on said support longitudinally of the cross line movement, a tracer means mounted for movement with said cross slide to engage said template and produce an electrical signal indicative of the desired movement of the cross slide, a further signal producing device connected to said cross slide to produce an electrical signal whose magnitude is indicative of the position of the cross slide, balanceable circuit means comprising said tracer means and said further signal producing means connected in opposition for controlling said first electromotive means to control the movement of the cross slide, said tracer means having a limited electrical signal output so as to provide for limited movement of said first electromotive means when said tracer means approaches the template, a multiple pass control means for initially controlling said first and second electromotive means to cause initial movements until the template is within range of said tracer means, said multiple pass control means including a plurality of adjustable signal producing devices each adjustable to give an electrical signal whose magnitude is representative of one of a plurality of desired positions of the cross slide relative to the carriage, bridge network means for controlling said first electromotive means comprising a selected one of said adjustable signal producing devices and said further signal producing device in opposition to cause the cross slide positioned by the first electromotive means to move an amount determined by the magnitude of the signal from the selected one of said adjustable signal producing devices, a plurality of adjustable limit switch means for defining desired movement of the carriage of said machine longitudinally, means connecting said limit switch means to said second electromotive means for limiting the movement of the carriage longitudinally of the template, and means including electric circuit means controlled by said limit switch means for sequentially connecting into controlling relation the several adjustable signal producing devices as operations determined by said adjustable signal producing devices are completed so as to cause successive operations of the machine each determined in depth by one of said adjustable signal producing devices and in length by the adjustable limit switch means until said tracer means is close to said template and is capable of maintaining the control of the first electromotive means.

4. Apparatus for controlling a machine: a support, a template mounted on said support, a cross slide mounted for movement on said support, and motive means for moving the cross slide on the support toward and away from the template, a tracer means mounted on said cross slide to engage said template and produce a signal indicative of the desired movement of the cross slide, a further signal producing device connected to said cross slide to produce a signal whose magnitude is indicative of the position of the cross slide, balanceable means comprising said tracer means and said further signal producing means connected in opposition for controlling said motive means to control the movement of the cross slide, said tracer means having a limited signal output so as to provide for limited accurate movement of the motive means when said tracer means approaches said template, a multiple step control means for initially controlling said motive means to cause initial movements until the template is within range of said tracer means, said multiple step control means including a plurality of adjustable signal producing devices each adjustable to give a signal whose magnitude is representative of one of a plurality of desired positions of the cross slide relative to the template, further balanceable means for controlling said motive means comprising a selected one of said adjustable signal producing devices and said further signal producing device in opposition to cause the cross slide positioned by the motive means to move an amount determined by the magnitude of the signal from the selected one of said adjustable signal producing devices, and means for sequentially connecting into controlling relation the several adjustable signal producing devices as operations determined by said adjustable signal producing devices are completed so as to cause successive operations of the machine each determined in depth by one of said adjustable signal producing devices until said tracer means is close to said template and is capable of maintaining the control of the motive means.

5. Apparatus for controlling a machine: a support, a template mounted on said support, a cross slide mounted for movement on said support, and motive means for moving the cross slide on the support toward and away from the template, a tracer means mounted for movement on said cross slide to engage said template and produce an electrical signal indicative of the desired movement of the cross slide, a further signal producing device connected to said cross slide to produce an electrical signal whose magnitude is indicative of the position of the cross slide, balanceable circuit means comprising said tracer means and said further signal producing means connected in opposition for controlling said electromotive means to control the movement of the cross slide, said tracer means having a limited electrical signal output so as to provide for limited accurate movement of the electromotive means when said tracer means approaches said template, a multiple step control means for initially controlling said electromotive means to cause initial movements until the template is within range of said tracer means, said multiple step control means including a plurality of adjustable signal producing devices each adjustable to give an electrical signal whose magnitude is representative of one of a plurality of desired positions of the cross slide relative to the template, balanceable bridge network means for controlling said electromotive means comprising a selected one of said adjustable signal producing devices and said further signal producing device in opposition to cause the cross slide positioned by the electromotive means to move an amount determined by the magnitude of the electrical signal from the selected one of said adjustable signal producing devices, and means for sequentially connecting into controlling relation the several adjustable signal producing devices as operations determined by said adjustable signal producing devices are completed so as to cause successive operations of the machine each determined in depth by one of said adjustable signal producing devices until said tracer means is close to said template and is capable of maintaining the control of the electromotive means.

6. A control system comprising in combination: a support, a movable tracer element, a pair of members mounted on said support and movable perpendicularly to each other, first motive means for driving the first of said members on the second of said members, second motive means for driving the second of said members on said support, first signal producing means responsive to a displacement of said tracer element from an initial position for producing a signal indicative of the desired movement of the first of said members relative to the second of said members, a second signal producing means connected to said first member and producing a signal whose magnitude is indicative of the position of said first member on the second of said members, first balanceable means comprising said first and second signal producing means connected in opposition and in controlling relation to said first motive means to control the movement of said first member, said first signal producing means having a limited signal output so as to provide for limited accurate movement of said first motive means when said first member is close to the desired position, a multiple pass control means for initially controlling said first and second motive means to cause initial movements of said first and second members until the same are within the range of control of said first balanceable means, said multiple pass control means including a plurality of adjustable signal producing devices each adjustable to give a signal output whose magnitude is representative of one of a plurality of desired positions of said first member relative to said second member, a second balanceable means controlling said first motive means comprising a selected one of said adjustable signal producing devices and said second signal producing means in opposition to cause the first member to move an amount determined by the magnitude of the signal from the selected one of said adjustable signal producing devices, a plurality of adjustable limit switch means for defining movement of the second member on said support, means connecting said limit switch means to said second motive means for limiting the movement of the second member relative to said support, and means controlled by said limit switch means for sequentially connecting into controlling relation the several adjustable signal producing devices as movements of said first member determined by said adjustable signal producing devices are completed so as to cause successive movements of said first member relative to said second member each determined by one of said adjustable signal producing devices and of said second member determined by the adjustable limit switch means until the first member is sufficiently close to the desired position that said first balanceable control means is capable of maintaining the control of the first motive means.

7. A control system comprising in combination: a support, a movable tracer element, a pair of members mounted on said support and movable perpendicularly to each other, first electromotive means for driving the first of said members on the second of said members, a second electromotive means for driving the second of said members on said support, first electrical signal producing means responsive to a displacement of said tracer element from an initial position for producing an electrical signal indicative of the desired movement of the first of said members relative to the second of said members, a second signal producing means connected to said first member to produce an electrical signal whose magnitude is indicative of the position of said first member on the second of said members, balanceable circuit means including said first and second signal producing means connected in opposition and in controlling relation to said first electromotive means to control the movement of said first member, said first signal producing means having a limited electrical signal output so as to provide for limited accurate movement of said first electromotive means when said first member is close to the desired position, a multiple pass control means for initially controlling said first and second electromotive means to cause initial movements of said first and second members until the same are within the range of control of said balanceable circuit means, said multiple pass control means including a plurality of adjustable signal producing devices each adjustable to give a variable electrical signal output whose magnitude is representative of one of a plurality of desired positions of said first member relative to said second member, bridge network means controlling said first electromotive means comprising a selected one of said adjustable signal producing devices and said second signal producing means in opposition to cause the first member to move an amount determined by the magnitude of the electrical signal from the selected one of said adjustable signal producing devices, a plurality of adjustable limit switch means for defining movement of the second member on said support, means connecting said limit switch means to said second electromotive means for limiting the movement of the second member on said support, and means including circuit means controlled by said limit switch means for sequentially connecting into controlling relation the several adjustable signal producing devices as movements of said first member determined by said adjustable signal producing devices are completed so as to cause successive movements of said first member relative to said second member each determined by one of said adjustable signal producing devices and of said second member determined by the adjustable limit switch means until the first member is sufficiently close to the desired position that said balanceable circuit means is capable of maintaining the control of the first electromotive means.

References Cited in the file of this patent

UNITED STATES PATENTS

| | | |
|---|---|---|
| 1,998,939 | Mittag | Apr. 23, 1935 |
| 2,630,038 | Buell et al. | Mar. 3, 1953 |
| 2,695,543 | Von Zelewsky | Nov. 30, 1954 |
| 2,720,129 | De Haas et al. | Oct. 11, 1955 |
| 2,820,937 | Fogiel | Jan. 21, 1958 |

FOREIGN PATENTS

| | | |
|---|---|---|
| 1,087,004 | France | Aug. 18, 1953 |
| 1,132,553 | France | Nov. 5, 1956 |